May 12, 1959  J. D. MOONEY ET AL  2,885,909
REVERSE GEAR MECHANISMS
Filed Sept. 3, 1954  4 Sheets-Sheet 2

INVENTORS
JOHN D. MOONEY
BY GEORGE P. TORGERSEN

Paul, Moore + Dugger
ATTORNEYS though the improved reverse gear mechanism showing
United States Patent Office 2,885,909
Patented May 12, 1959

2,885,909

REVERSE GEAR MECHANISMS

John D. Mooney and George P. Torgersen, St. Paul, Minn., assignors to Auto Engine Works, St. Paul, Minn., a corporation of Minnesota Application September 3, 1954, Serial No. 454,008

5 Claims. (Cl. 74—780)

This invention relates to new and useful improvements in reverse gear mechanism, and more particularly to a combination reverse and reduction gear for marine engines.

An important object of the present invention is to provide a reverse gear mechanism for marine engines embodying a driving bevel gear, a driven bevel gear, and planetary bevel gears for transmitting power from the engine crank shaft to the usual propeller shaft, and the operation of said bevel gearing being controlled by the operation of a fluid operated friction clutch and brake by the simple manipulation of a single manually operable control lever.

A further object of the invention is to provide a reverse gear mechanism in which the traveling movement of the craft may be quickly reversed, when desired, without shock, and without imparting severe strains to the working parts of the gear mechanism and craft.

A further object is to provide a reverse gear mechanism for marine engines including bevel gearing for driving the usual propeller shaft of the craft in either a forward or reverse direction, said bevel gearing comprising a gear supporting member or drum having opposed clutch- and brake-supporting end portions adapted to support a disc clutch and brake, and said gear supporting member or case being provided intermediately of its ends with an outwardly extending annular member which serves as a piston, and an annular tubular or hollow cylinder member being fitted over said annular piston member, and cooperating therewith to provide opposed axially spaced annular pressure fluid chambers or cylinders, and a fluid circulating system in said gear mechanism interconnected with said pressure fluid chambers or cylinders and comprising a single control element for selectively controlling the flow of pressure fluid to and from said chambers, thereby to selectively control the operation of said clutch and brake, and therefore the direction of rotation of the propeller shaft.

A further object of the invention is to provide an improved reverse gear mechanism of the class described, comprising a clutch and brake adapted to be alternately actuated by relative axial movement of an annular operating member or cylinder movable under fluid pressure to selectively render said clutch and brake operable to drive said gear mechanism, and means being provided for controlling the flow of pressure fluid from one pressure chamber or cylinder to the other, whereby the time required to bring the propeller shaft from zero to full speed in either direction may be accurately controlled to eliminate the generation of shocks or excessive strains in the transmission under starting or reversing operations.

A further object of the invention resides in the unique arrangement of the fluid circulating system, and particularly in the manner in which the pressure pump is driven from the engine shaft to maintain the fluid under constant pressure at all times, when the transmission is in operation, said pressure fluid also serving as a lubricant to maintain all moving parts of the mechanism adequately lubricated at all times.

Other objects of the invention reside in the arrangement of the fluid circulating system for conducting the pressure fluid to and from the clutch and brake, which includes a valve having a single control lever, and said control lever having a relatively short movement from neutral to either its reverse or forward positions, whereby a fingertip control is provided for controlling the operation of the mechanism, and whereby the operator may quickly and without effort, control the directional movement of the craft; in the location of the usual oil filter and oil cooler in the discharge side of the fluid circulating pump, whereby the pressure fluid delivered to the annular fluid pressure chambers or cylinders of the gearing to operate the clutch and brake is continually subjected to the action of the filter and cooler before entering the control valve and annular fluid pressure chambers; in the provision of an oil pan in the lower portion of the main housing of the transmission, having its bottom wall spaced upwardly from the bottom wall of the housing and disposed in proximity to the periphery of the back gear in the lower portion of said housing, thereby to assure adequate lubrication of the back gear and its drive pinion; and in the unique and compact orientation and arrangement of the various parts of the gear mechanism, whereby all parts are readily accessible for inspection and repairs.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Supporting structure

The supporting structure of the novel reverse gear mechanism herein disclosed is shown comprising a main housing 2 having a closure plate 3 secured to its forward end by suitable bolts 4. The closure plate 3 is adapted to be secured to the bell housing 5 of the engine by suitable bolts 6, indicated in dotted lines in Figure 1. The housing 2 has a rear wall 7 to which the forward end of an auxiliary housing 8 is secured by such means as bolts 9. The rear end of the auxiliary housing is normally closed by a suitable closure or cap 11, detachably secured thereto by such means as bolts 12. The auxiliary housing 8 has a removable top cover 13 having a suitable breather 14 therein.

Driven shaft of differential gearing

A driven shaft, generally designated by the numeral 15, is mounted in suitable bearings 16 and 17 in the upper portion of the auxiliary housing 8. The inner race of bearing 17 is mounted on a reduced extension 18 of shaft 15, and the outer race of said bearing is shown supported in a suitable cup-shaped retainer 19, supported in a bore provided in the cap 11 of the auxiliary housing 8.

The forward end of shaft 15 extends through a bushing 21 supported in a bore provided in the rear wall 7 of the main housing 2. Bushing 21 is non-rotatably secured in the bore of wall 7 by suitable means, not shown. The forward end of shaft 15 carries bevel gearing, generally designated by the numeral 22, subsequently to be described. Shaft 15 has an axial bore 23 extending from the rear end thereof and terminating at its forward end portion in an enlarged bore 24.

An elongated insert 25 is fitted into the enlarged bore 24 of shaft 15, and has an enlarged head 26 at its forward end. The head 26 is rotatably received in a bushing 27 supported in a bore provided in a flanged member, generally designated by the numeral 28. Member 28 is fixedly secured to the flange 29 of the engine crankshaft 31, indicated in dotted lines in Figure 1. The major portion of the periphery of insert 25 within the shaft bore 24 is relieved or reduced in diameter, whereby the periphery of the reduced portion of said insert cooperates with the wall of the bore 24 to provide an annular fluid passage 30, the function of which will subsequently be described. The opposed end portions of insert 25 within the bore 24 snugly fit said bore to support the insert in axial alignment with shaft 15. Means, not shown, is provided for securing the insert against relative rotation within bore 24.

Differential gearing and clutches

Figures 1, 2:
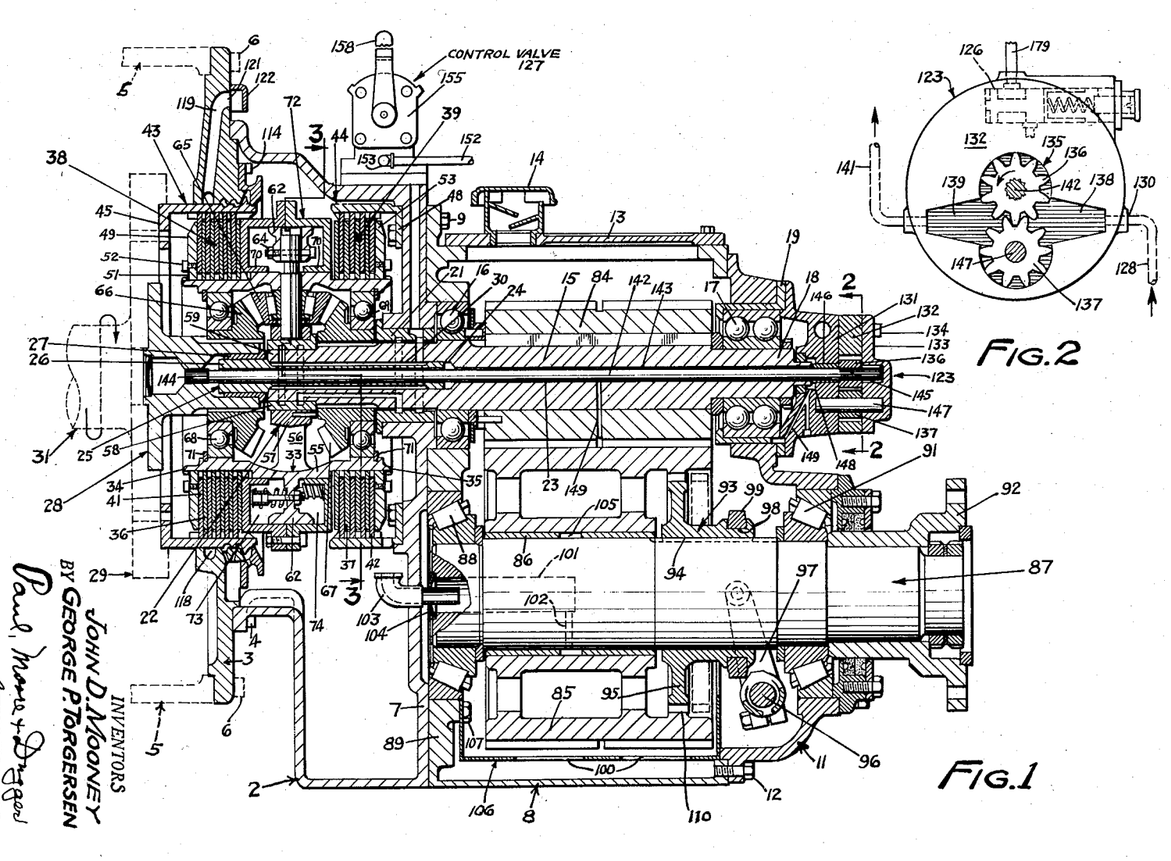
Figure 1 is a longitudinal, vertical sectional view through the improved reverse gear mechanism showing the forward clutch actuated to drive the propeller shaft in a direction.
Figure 2 is an enlarged detail sectional view substantially on line 2—2 of Figure 1, showing the fluid pressure pump and the location of the pressure relief valve in the pump housing.
Figures 5, 6, 7:
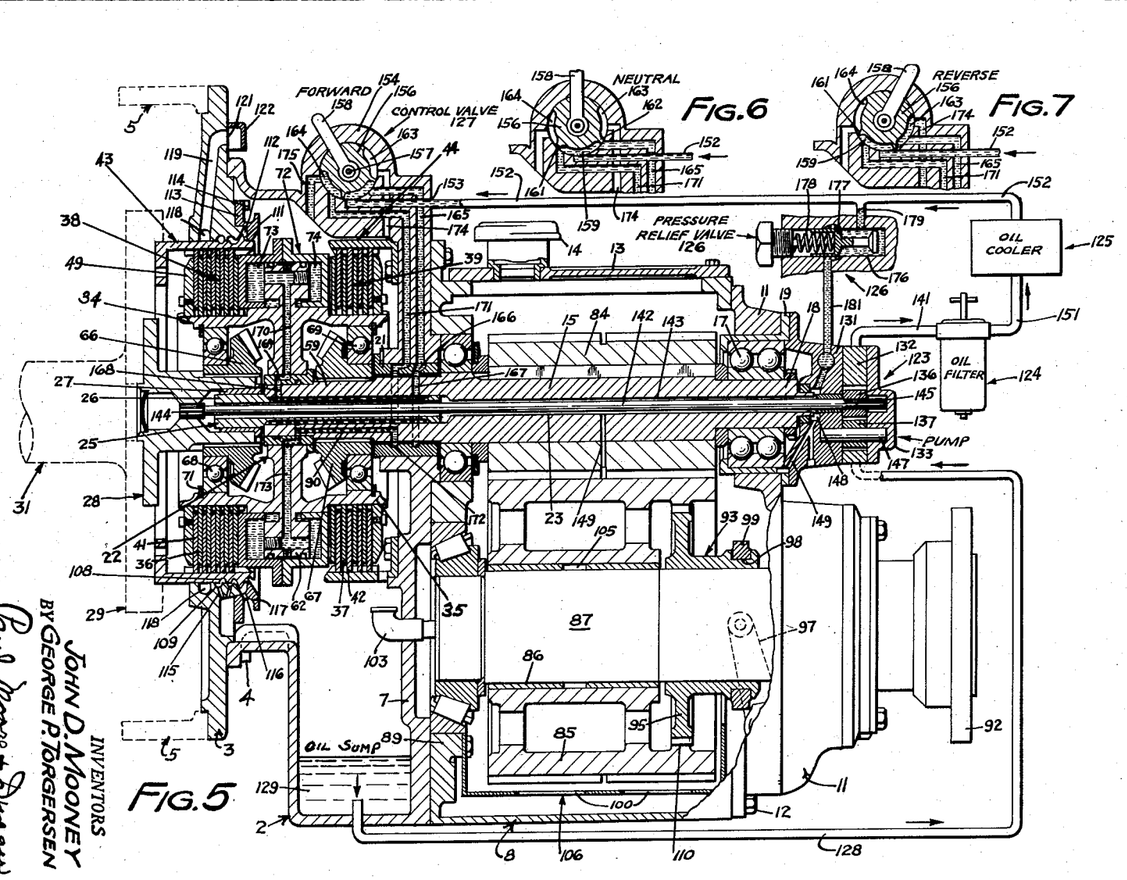
Figure 5 is an enlarged vertical sectional view similar to Figure 1, diagrammatically illustrating the fluid circulating system of the apparatus, with the operating handle of the control valve in its forward position whereby the clutch is actuated to rotate the propeller shaft in a forward direction, as in Figure 1.
Figure 6 is a detail sectional view through the control valve showing the operating handle in its neutral position.
Figure 7 is a view similar to Figure 6, but showing the valve operating handle in reverse position.

The gearing 22, hereinbefore referred to, is located within the main housing 2, and comprises a suitable drum 33. In Figures 1 and 5, the drum 33 is shown provided with oppositely disposed cylindrical end clutch and brake supporting portions 34 and 35, having circumferentially spaced teeth or notches in their peripheries adapted for interlocking engagement with a plurality of internal complemental teeth or notches provided in a plurality of clutch-plates 36 and brake plates 37 of disc clutch 38 and brake 39, respectively.

Interposed between the clutch plates 36 and brake plates 37 of clutch 38 and brake 39 are complemental clutch plates 41 and brake plates 42, respectively. Clutch plates 41 and brake plates 42 have external teeth which interlock with the internal teeth of clutch drum 43 and brake drum 44. Clutch drum 43 is shown provided at its forward end with an inturned flange 45 adapted to be seated against and bolted to the usual flange 29 of the engine crank shaft 31, whereby the drum 43 rotates synchronously with the engine crank shaft. Brake drum 44 has a similar inturned flange 48 shown bolted to the back wall 7 of the main housing, as will be understood by reference to Figures 1 and 5 of the application drawings. Thus, the clutch drum 43 rotates continuously when the engine is operating, whereas the brake drum 44 is stationary.

In Figures 1 and 5, the friction discs of the clutch 38 are shown restrained against outward or forward movement by an annular abutment plate 49, shown mounted upon and secured to the forward end of the cylindrical end portion 34 of gear case 33 and fixed in position thereon by a suitable lock ring 51 and screws 52. The friction discs of the brake 39 are limited against outward or rearward movement by a similar abutment plate 53. The specific construction of clutch 38 and brake 39 and their function, is well known in the trade, and it is therefore believed unnecessary to herein describe the same in greater detail.

The differential gearing 22, as hereinbefore stated, comprises the gear case 33, shown having a centrally disposed cylindrical portion 55 with which the oppositely disposed cylindrical clutch-supporting portions 34 and 35 are shown integrally formed, as indicated in Figures 1 and 2. The centrally disposed portion 55 of drum 33 is shown provided with a plurality of integral radial arms 56 and a supporting hub 57. Hub 57 is bored to fixedly receive a suitable bushing 58 which rotatably supports the forward reduced end portion 59 of driven shaft 15, as clearly illustrated in Figures 1 and 5.

Figures 3, 4, 8:
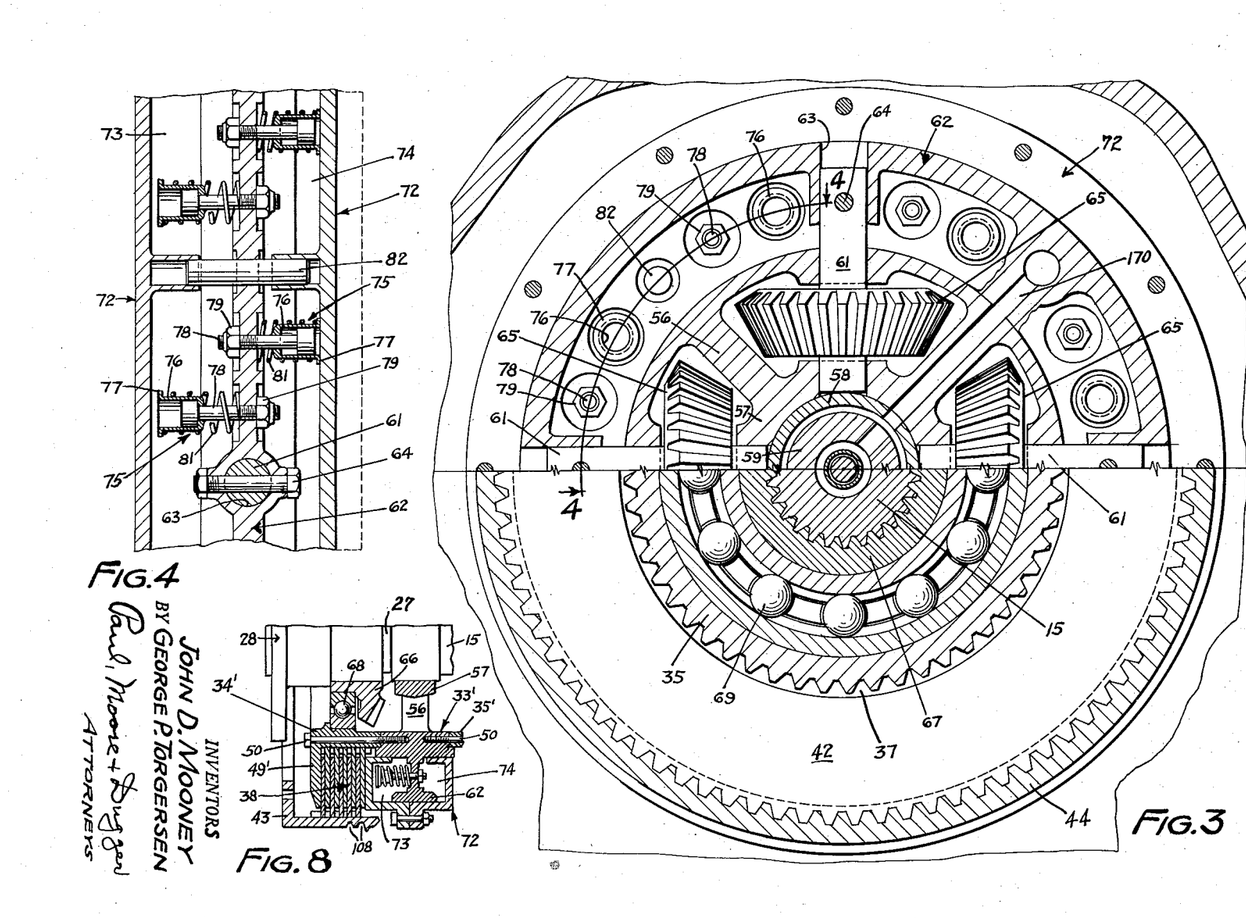
Figure 3 is an enlarged cross-sectional view on the line 3—3 of Figure 1, with some of the parts omitted.
Figure 4 is a fragmentary, detail sectional view on the line 4—4 of Figure 3, showing a means for returning the annular cylinder to its neutral position when the pressure in the fluid chamber is released, as when the control valve is returned to its neutral position.
Figure 8 is a detail sectional view showing a slightly modified construction, wherein the oppositely disposed cylindrical clutch and brake supporting end portions of the drum are made independently thereof and are detachably bolted thereto.

A plurality of radially disposed stub shafts 61 are mounted in the drum 33 and have their inner ends supported in the hub 57. The outer ends of the stub shafts 61 are non-rotatably supported in a plurality of radially disposed bores 63 provided in member 62, as best shown in Figures 3 and 4. Bolts 64 secure stub shafts 61 in place. The annular member 62 is shown as constituting an integral part of the cylindrical central portion 55 of gear case 33.

A bevel pinion or planet gear 65 is freely rotatable on each stub shaft 61, and are in constant mesh with a pair of relatively larger bevel gears 66 and 67, as in a conventional differential. Gear 66 is suitably keyed to the hub of the flanged member 28 for direct rotation with the engine crankshaft, and gear wheel 67 is non-rotatably secured to the driven shaft 15 for direct rotation therewith. The hubs of gears 66 and 67 are shown mounted in anti-friction bearings 68 and 69, respectively, supported in the cylindrical end portions 34 and 35 of the drum 33. Bearings 68 and 69 may be retained in position in the drum 33 by suitable lock rings 71, indicated in Figures 1 and 5.

An important feature of the present invention resides in the means provided for selectively controlling the operations of the clutch 38 and brake 39. Such means is shown comprising an annular tubular member or cylinder, generally designated by the numeral 72. Member 72 is interposed between the clutch and brake, and is shown provided with inturned flanges 70 bored to slidably fit the central cylindrical portion 55 of drum 33. The enlarged inner cylindrical wall surface of member 72 similarly slidably engages the periphery of member 62. The tubular member or cylinder 72 completely encircles and encloses member 62.

The annular member 62 of the drum divides the interior of the annular tubular member 72 into axially spaced pressure chambers 73 and 74. These chambers are normally completely filled with a pressure fluid, such as lubricating oil, which, in addition to lubricating all moving parts of the gear mechanism, also serves as a pressure fluid to effect selective actuation of the clutch 38 and brake 39. The opposed end walls of the tubular member or cylinder 72 are disposed in parallel relation, and are adapted to alternately engage the adjacent clutch plates of the clutch 38 and brake 39, respectively, thereby to selectively control the operation of the transmission, as will subsequently be described.

From the foregoing, it will be noted that the annular tubular member or cylinder 72 functions as a double-acting cylinder, in that it is axially movable on the drum 33 between the clutch 38 and brake 39, and is adapted to be selectively moved into and out of operative engagement with said clutch and brake by fluid pressure. The annular radially disposed member 62 of the gear case is concealed within the tubular member 72, and serves as a piston. If deemed necessary, suitable sealing elements, such as O-rings, not shown in the drawings, may be provided between the sliding surfaces of the dual bores of member 72 and the peripheries of drum 33 and the radial member 62. The annular tubular member or cylinder 72 is preferably split to facilitate machining and assembly, and the two parts thereof are shown provided with co-acting flanges, whereby they may readily be bolted together in leak-tight relation for operation as a unit.

Means is provided in the wall of the piston member 62 of gear case 33 for constantly urging the member 72 into its neutral position, out of operative engagement with the clutch 38 and brake 39. Such means is best illustrated in Figures 3 and 4, and comprises a plurality of spring-actuated devices, generally designated by the numeral 75, mounted in the radial wall of piston member 62. Each device 75 comprises a cup-shaped element 76 having an annular flange 77 at its outer end. The bottom wall of each cup 76 is apertured to receive a bolt 78, the heads of which are seated in the bottoms of the cup-shaped elements 76. The opposite end of each bolt 78 is received in threaded engagement with the radial web or wall of piston member 62, and is adjustably fixed therein by a suitable lock nut 79. A spring 81 is coiled about each bolt 78 and each has one end seated against the wall or web of the piston member 62, and its opposite end against the annular flange 77 provided at the open end of the cup-shaped element 76.

When the cylinder member 72 is in its neutral position, the open ends of the cup-shaped elements of the spring-actuated devices 75 engage the inner wall surfaces of the member 72 with a very light touch, sufficient, however, to neutralize the position of member 72 with respect to piston member 62. When cylinder member 72 is actuated to effect operation of clutch 38, and is moved towards said clutch by the pressure fluid in chamber 73, the rear wall of member 72 will engage the open flanged ends of the cup-shaped elements 78 of the devices 75, located within pressure chamber 74, as indicated at the right-hand side of Figure 4. When so positioned, the springs of the devices 75 in chamber 74 are placed under tension, and are thus conditioned to quickly return cylinder member 72 to its normal neutral position, when the pressure fluid within chamber 73 is released.

Guide pins 82 are preferably provided between members 72 and 62, as shown in Figure 4, to prevent relative rotation of member 72 with respect to member 62. Neutralizing devices 75 are alternately arranged in the piston member 62 around the circumference thereof, as clearly indicated in Figures 3 and 4 of the application drawings.

Reverse gearing

In a reverse gear mechanism such as herein disclosed, means must be provided for driving the propeller in either forward or reverse direction, and is here shown comprising a pinion 84 mounted upon and secured to the driven shaft 15. Pinion 84 meshes with a relatively larger back gear 85, shown having a bushing 86 secured in the bore thereof which, in turn, is freely rotatable on a propeller shaft, generally designated by the numeral 87.

Propeller shaft 87 is shown mounted directly below driven shaft 15 within the auxiliary gear housing 8, and has its forward end supported in a suitable radial-thrust bearing 88, supported in the front wall 89 of the auxiliary housing 8. The opposite end of the propeller shaft 87 is shown mounted in a similar radial-thrust bearing 91, supported in the cap 11 of the rear end of housing 8. A suitable coupling member 92 is shown secured to the rear end of shaft 87 to facilitate coupling a member to be driven to said shaft as, for example, a propeller.

Propeller shaft clutch

Means is provided for controlling the driving connection between the back gear 85 and the propeller shaft 87, and comprises a hub 93 mounted for relative sliding movement on shaft 87, but secured against relative rotation thereon by such means as a spline or feather key, indicated at 94 in Figure 1. Hub 93 is provided at its forward end with an annular toothed clutch member 95, simulating a spur gear. Member 95 is movable into and out of driving engagement with an internally toothed member or gear 110 provided on the rear end portion of back gear 85.

A clutch shaft 96 is shown mounted in the rear enclosing cap 11 and has a forked lever 97 secured thereto which straddles the annularly grooved hub 93 of the clutch member 95, and has its terminals operatively engaged with a clutch ring 99, shown mounted in a peripheral groove 98 in the hub 93. When clutch member 95 is in clutching engagement with the clutch teeth 110 of the back gear 85, as shown in full lines in Figure 1, shaft 87 and back gear 85 rotate as a unit, when driven by the pinion 84 secured to the driven shaft 15.

When the clutch shaft 96 is actuated to shift clutch member 95 into de-clutching position, indicated in dotted lines in Figure 1, the driving connection between back gear 85 and the propeller shaft 87 is rendered ineffective, whereby rotation of the propeller shaft is interrupted, as will be understood.

In a marine gear mechanism such as herein disclosed, it is important that adequate lubrication of all moving parts may be assured, and particularly the slower rotating propeller shaft 87. To assure adequate lubrication of the propeller shaft 87, the forward end thereof is shown provided with an axial bore 101 having radially disposed oil ducts 102 leading from its inner end to the periphery of said shaft, as indicated in dotted lines in Figure 1. An oil-receiving cup 103 is shown mounted in the rear wall 7 of the main housing 2, and has its discharge end projecting into the bore 101 in shaft 87. A suitable sealing element 104 may be provided at the open end of bore 101 to prevent leakage of the lubricant therefrom. The bushing 86 secured in the bore of the back gear 85 is shown having an annular central groove 105 which is constantly in communication with the bore 101 of shaft 87 through the oil ducts 102.

An oil pan 106 is secured in the lower portion of the auxiliary housing 8 by such means as bolts 107. The bottom wall of the oil pan 106 is spaced upwardly from the bottom wall of the auxiliary housing 8, and is positioned in proximity to the periphery of the back gear 85 so that any oil contained in the oil pan 106 may contact the teeth of the back gear and thus be carried upwardly into contact with the teeth of the drive pinion 84, as will be understood. The bottom wall of the oil pan 106 is preferably provided with restricted slots or oil passages 100 which are so sized as to cause the oil to well up sufficiently in the pan to contact the teeth of gear 85 during normal operation of the gearing. Oil continually flows through the oil passages or slots 100 into the oil sump or reservoir in the bottom of the housing.

Lubricant sealing means

Another important feature of the invention resides in the means provided for preventing leakage of lubricating oil or fluid from the forward end of the main housing into the bell housing of the engine. Such means is shown comprising a labyrinth structure formed in the front wall 3 of the main housing, as best illustrated in Figures 1 and 5. As here shown, the periphery of the clutch drum 43 has a plurality of annular grooves 108 therein arranged in opposed and offset relation to a plurality of inwardly facing grooves 109, provided in the bore of the fixed wall member 3. By thus arranging grooves 108 and 109, the walls of grooves 108 serve as oil slingers to centrifugally throw any surplus oil engaging the grooved periphery of drum 43 outwardly into the grooves 109 of the fixed end wall 3 of the housing.

The drum 43 also has an outwardly extending annular oil slinger rib 111 received in an inwardly facing groove 112 provided by a member 113 secured to the wall 3 by such means as bolts 114. The annular grooves 109 and 111 of front wall 3 are shown provided at their lowermost portions with a plurality of small oil return ducts 115 and 116 which cooperate to conduct lubricant from said grooves back into the main housing 2, as will be understood by reference to Figures 1 and 5. Member 113 is formed with an annular peripheral groove 117 which serves to conduct fluid thrown against the upper forward wall portion of the housing by the revolving parts of the gear mechanism, back into the housing, as will be understood.

Also provided in the front wall 3 of the main housing is an inwardly facing relatively larger annular groove or air duct 118, which is in communication with an air passage or vent 119, provided in the upper portion of the front wall 3. Groove 118 is adapted to receive surplus oil from the rapidly rotating periphery of clutch drum 43 and conduct it back into the housing. A drain duct, not shown, is provided in the lower portion of the front wall 3 for thus conducting fluid or oil from groove 118 to the oil sump in the housing. Air passage 119 serves as a breather to allow air to enter or leave the housing and thereby minimize or equalize either vacuum or pressure which may develop in bell housing 5, when the parts are rotating. Air passage or vent 119 is open to the atmosphere at 121. A suitable cap 122 prevents foreign matter from entering vent passage 119.

In Figure 8 there is illustrated a slightly modified construction wherein the opposed clutch and brake portions of the drum are made independently of the rest of the drum, and are designated by the numerals 34' and 35'. In this modified form, the drum is identified by the numeral 33'. Its periphery is relatively narrower than the periphery of drum 33, and its ends are provided with annular seats for receiving the clutch portion 34' and brake portion 35', shown secured to their respective seats by screws 50. Abutment walls 49' and 53' are shown integrally formed with the clutch portion 34' and brake portion 35', respectively, to provide, in effect, an integral structure, as will be understood. The operation of the structure disclosed in Figure 8 is identically the same as that of the structure illustrated in the previous figures.

Fluid circulating system

Another feature of the present invention resides in the novel arrangement of the fluid circulating system, whereby a portion of the lubricating oil in the oil sump may be selectively directed into pressure chambers 73 and 74, defined by the piston member 62 and cylinder member 72 to effect operation of the clutch 38 and brake 39.

Briefly, the fluid circulating system comprises an oil pump 123, an oil filter 124, an oil cooler 125, a pressure relief valve 126, and a control valve 127, as indicated in Figure 5. In this figure, which schematically illustrates the connections between the various elements of the system, oil is supplied to the pump 123 through a conduit 128 having its intake end in communication with the oil sump 129, and having its opposite end connected to the intake 130 of the pump 123.

The housing of pump 123 is shown comprising three parts; an inner member 131, an intermediate member 132, and an outer member or cap 133. These parts are secured together by bolts 134 to provide a composite pump structure. The intermediate part 132 of the pump has a chamber therein, generally designated by the numeral 135, in which is mounted the usual pump gears 136 and 137, best illustrated in Figure 2. Chamber 135 has an intake portion 138 which is in communication with the fluid supply conduit 128 of the pump. Chamber 135 also has a discharge portion 139 which is in communication with one end of a conduit 141, leading from the pump 123 to the intake side of the filter 124, shown in Figure 5.

Another feature of the invention resides in the novel means provided for driving the pump gears 136 and 137, whereby the pump is always operated when the engine crankshaft is operated. The means provided for thus driving the pump is shown comprising an elongated rod-like shaft 142 supported in the axial bore 23 of the driven shaft 15, as best illustrated in Figures 1 and 2. Shaft 142 is relatively smaller in diameter than the bore 23, thereby to provide an annular oil circulating passage 143 around shaft 142, which extends from the rearmost end of the driven shaft 15 to the enlarged bore 24 provided in the forward end of shaft 15.

The forward end portion of shaft 142 is received in a bore provided in the insert 25 and has its foremost end splined to the flanged member 28, as indicated at 144. Shaft 142 thus rotates synchronously with member 28, and therefore the engine crank shaft 31 to which the member 28 is fixedly secured. The opposite end of the pump drive shaft 142 is splined to the pump gear 136, as indicated at 145. A bushing 146 is fixed in the member 131 of the pump to rotatably support the rear end portion of the pump shaft adjacent to its splined connection with the pump gear 136. Pump gear 137 is rotatably supported on a pin 147 having its terminals supported in the pump members 131 and 133, as clearly indicated in Figures 1 and 5.

The inner pump member 131 has an annular fluid chamber 148 therein having one end of a duct 149 in communication therewith. The opposite end of duct 149 is in communication with the anti-friction bearing 17 to provide a constant flow of lubricant thereto. Surplus oil may drain from said bearing into the interior of the auxiliary housing 8. The annular chamber 148 of pump member 131 is also in communication with the annular fluid passage 143 surrounding the pump drive shaft 142, whereby oil may circulate freely through the bore 23 to one or more radial ducts 149 provided in the driven shaft 15 and pinion 84.

A conduit 151 establishes communication between the oil filter 124 and the oil cooler 125, and a conduit 152 connects the discharge of the oil cooler with the intake 153 of the control valve 127, as indicated in Figures 1 and 5. Thus, when the engine is operating, the pump is actuated to deliver a constant supply of oil under pressure to the control valve 127. The oil filter 124 and cooler 125 may be of well-known construction, and it is therefore deemed unnecessary to herein describe the same in detail.

Fluid control valve

The fluid control valve 127 is shown mounted on top of the main housing 2, but it is to be understood that it may be otherwise located, if desired. The valve comprises a housing 154, shown provided with a detachable end plate 155, whereby access may be had to the interior of the valve.

A rotor 156 is rotatably mounted within the valve housing 154 and is secured to a rock shaft 157 supported in the rear wall of the pump housing and in the end plate 155, as will be understood. An operating handle 158 is secured to valve shaft 157, whereby it may be conveniently manipulated by an operator stationed adjacent to the apparatus.

Control valve 127 is in the form of a three-way valve, whereby the operating handle 158 has three positions, a neutral, shown in Figures 1 and 6; a forward position, indicated in Figure 5; and a reverse position, indicated in Figure 7. The supply conduit 152 is in constant communication with a centrally disposed recess 159 in the lower portion of the valve rotor 156, as clearly indicated in Figures 5, 6 and 7. Recess 159 is defined by radial wall portions 161 and 162, and similar recesses 163 and 164 are provided in the periphery of the valve rotor 156 at opposite sides of the central recess 159.

The control valve 127 has fluid connections with the pressure chambers 73 and 74, defined by the annular piston member 62 of the drum 33, and the double-acting cylinder or clutch- and brake-actuating member 72, whereby fluid under pressure may be directed to and from said chambers to effect selective operation of the clutch 38 and brake 39, as will subsequently be described.

As best shown in Figure 5, a fluid passage 165 leads from the control valve 127 to an annular fluid passage 166 provided in the sleeve or bushing 21. The intake of fluid passage 165 is shown located at the right-hand side of the pump intake 153, when viewed as shown in Figures 5, 6 and 7. A port 167 is provided in driven shaft 15 and establishes communication between groove 166 and the annular fluid-circulating passage provided between the periphery of insert 25 and the wall of the bore 24 in shaft 15. Fluid may thus circulate through said annular passage to a radial fluid passage 168 provided in the front end portion of the driven shaft 15, and through a port 169 in bushing 58 of the hub 57 of drum 33. From port 169 in bushing 58, the fluid flows through a passage 170 provided in one of the arms 56 of gear case 33, to pressure chamber 73 in the annular piston member 72, as clearly illustrated in Figure 5.

A fluid passage 171 similar to passage 165, has one end in communication with the interior of control valve 127 at the opposite side of the intake 153. The opposite end of passage 171 is in communication with an annular groove 172, also provided in the sleeve or bushing 21. Groove 172 is in communication with one end of a longitudinally extending passage 90 provided in the driven shaft 15. The opposite end of passage 90 is in communication with a fluid passage 173 provided in another arm 56 of the drum and having its outer end in communication with pressure chamber 74. See Figure 5.

The radial projections or wall portions 161 and 162 of the valve rotor 156 which separate peripheral recesses 159, 163 and 164 from one another, are so spaced apart circumferentially, that when the rotor is in its neutral position, shown in Figure 6, fluid passages 165 and 171 are in communication with the central recess 159, which, in turn, is continually in communication with the fluid supply conduit 152, as will be noted by reference to Figures 5, 6 and 7. Thus, when the valve handle 158 is in its neutral position shown in Figures 1 and 6, the fluid pressure in chambers 73 and 74 is equalized, whereby the axially movable cylinder member 72 assumes its normal neutral position, whereby clutch 38 and brake 39 are inoperative, and the driven shaft 15 is at rest.

Oppositely disposed peripheral recesses 163 and 164 in the valve rotor 156 function as exhaust passages to permit the pressure fluid in pressure chambers 73 and 74 to return to the interior of the main housing and back to the oil sump 129, provided in the lower portion of the housing. Valve housing 154 is provided with exhaust passages 174 and 175 having their intake ends connected respectively with the peripheral exhaust recesses 163 and 164 of the valve rotor. The discharge ends of exhaust passages 174 and 175 are in communication with the interior of the gear housing, as indicated in Figure 5.

*Operation*

When the gear mechanism is at rest, prior to starting the engine, and the handle 158 of the control valve 127 is in neutral position, passages 165 and 171 are in communication with each other and with the fluid supply conduit 152 through the peripheral recess 159 in the valve rotor 156, as best illustrated in Figure 6.

Upon starting the engine, with the control valve in neutral, as above, the flange 29 of the engine crank shaft 31 rotates up to normal engine idling speed, whereupon pump 123 is operated to deliver fluid under pressure to passages 165 and 171, because of the pump having a driving connection with the crank shaft through shaft 142 and flanged member 28. The fluid thus delivered to passages 165 and 171, when the control valve is in neutral, builds up uniform fluid pressure in chambers 73 and 74, whereupon the double-acting clutch- and brake-actuating or cylinder member 72 is retained in neutral position, out of operative engagement with the clutch 38 and brake 39.

When the clutch- and brake-actuating member 72 is thus in neutral position, the bevel gears 65 and drum 33 are free to idle, and under such condition, the flanged member 28 of the crank shaft is ineffective to impart rotation to the drive shaft 15, the bevel gears being free to rotate and roll around between gears 66 and 67, as will be immediately apparent to those skilled in the operation of this type of gearing.

When the gear mechanism is to be operated to propel the craft in a forward direction, valve handle 158 is shifted from its neutral position, shown in Figures 1 and 6, to its forward position, shown in Figure 5. Such shifting of the valve handle cuts off the supply of pressure fluid to passage 171, and simultaneously opens exhaust port 175 in the valve, whereupon the fluid pressure in chamber 74 is released. At the same time, pressure builds up in chamber 73, and thus axially shifts cylinder member 72 in a forward direction into operative engagement with the clutch 38.

Such actuation of clutch 38 locks drum 33 to clutch drum portion 43, whereupon the gearing 22, including the drum 33, bevel gears and pinions 65, 66 and 67 and driven shaft 15 will revolve as a unit with the clutch drum portion 43 around the axis of the crank shaft 31. During such rotation of the gearing, the planet gears 65 cannot relatively rotate on their respective shafts 61, inasmuch as they are rotating coordinately with the crank shaft 31. By thus locking the planet bevel gears 65 against relative rotation upon their respective shafts 61, they act as keys between gears 66 and 67, whereby shaft 15 is driven directly with the clutch drum portion 43 and the engine crank shaft in a forward direction.

When it is desired to reverse rotation of the driven shaft 15, valve handle 158 is shifted to its reverse position, indicated in Figure 7, whereupon the fluid pressure in chamber 73 is released. Simultaneously, pressure chamber 74 is opened to the pressure fluid through the control valve 127, whereby the clutch- and brake-actuating member or cylinder 72 is moved into engagement with the brake 39, thereby to lock the drum 33 to the stationary brake drum 44. When the gear case is thus locked against rotation about the axis of the engine crank shaft 31, the planet gears 65 are similarly locked against rotation about the axis of the engine crank shaft, but they are free to revolve upon their respective shafts 61 by the action of the rotating gear 66. Such relative rotation of the planet gears 65 upon their respective shafts while the latter are locked against rotation by brake 39, will cause gear 67 to be rotated in a direction opposed to the direction of rotation of the engine crank shaft 31, whereby shaft 15 will be driven in reverse with bevel gear 67 because of being keyed directly thereto, as will be understood.

It will thus be noted that the operation of the novel reverse gear mechanism herein disclosed is hydraulically controlled by the simple manipulation of the single control valve 127. Rotation of the propeller shaft 87 may be interrupted at any time during rotation of the driven shaft 15 by manipulation of the auxiliary clutch member 93, which provides the driving connection between back gear 85 and propeller shaft 87. The pressure fluid utilized for operating clutch 38 and brake 39 also serves to lubricate all moving parts of the mechanism.

Means is also provided for preventing excessive pressures from developing in the fluid circulating system, and consists of the pressure relief valve 126, diagrammatically illustrated in Figure 5. This valve is shown located in the inner member 131 of pump 123, and comprises a bore 176 having a valve element 177 slidably mounted therein. A spring 178 constantly urges the valve into its normal closed position. Bore 176 is shown in constant communication with the fluid supply conduit 152 through a connection 179.

When the pressure in the bore 176 of the relief valve exceeds a predetermined figure, the tension of spring 178 is overcome, and the valve then uncovers a passage 181 which establishes communication between the high pressure fluid supply conduit 152 and the interior of the auxiliary housing 8, whereby all or a portion of the high pressure fluid may by-pass through the pressure relief valve 126 back to the oil sump 129. The pressure relief valve is of well-known construction, and it is therefore believed unnecessary to further describe the same in detail.

The present invention provides a highly improved hydraulically operated mechanical reverse gear mechanism or marine gear in which substantially all the objectionable features now inherent in many such structures in common use have been substantially completely eliminated. The invention has proven extremely practical and efficient in actual operation. The single manually operable control valve 154 is located conveniently on the housing of the apparatus, whereby it is readily accessible and provides a simple fingertip control for controlling the forward and reverse movements of the vessel. The single control lever or handle 158 has three positions; a neutral, a forward, and a reverse. Either the clutch or the brake may be thrown in or out at will, but they cannot be rendered operative at the same time.

When utilizing control valve 127, hereinbefore shown and described, the operation of shifting the reverse gearing from neutral into full forward speed, or from full forward to full reverse, is controlled entirely by the operator's manual manipulation of the valve lever 158. Thus, to effect smooth and gradual starting of a boat or craft, the operator must so manipulate the valve handle 158 as to cause the flow of pressure fluid to the pressure chamber 73 to be gradual, so that the shifting of the clutch and brake actuating member or cylinder 72 from neutral into clutching engagement with the forward clutch 38 will be gradual and under complete control. At the same time, the pressure fluid is released from chamber 74 and returns through duct 171 to the control valve, and thence to the interior of the housing, as will be understood.

After having started the craft in a forward direction, should the operator suddenly elect to reverse the traveling movement of the craft, he must exert care in shifting the valve lever 158 from its forward position, shown in Figure 5, to its reverse position, shown in Figure 7. In other words, the movement of the valve lever 158 from one position to another must be gradual to avoid imparting severe shocks and excessive strains to the operating parts of the mechanism, which could result should the operator quickly shift the control lever from one position to another. It will thus be seen that the form of control valve and fluid circulating system shown and described in the foregoing may require a certain amount of skill on the part of the operator to assure smooth and shockless starting and reversing of the craft.

In some instances, it may be desirable to equip the reverse gear mechanism herein disclosed with a shockless or shock-proof control, whereby the clutch 38 and brake 39 cannot "grab," regardless of how the valve lever 186 is manipulated. Such a control is diagrammatically illustrated in Figures 9, 10, 11 and 12.

Figure 9:
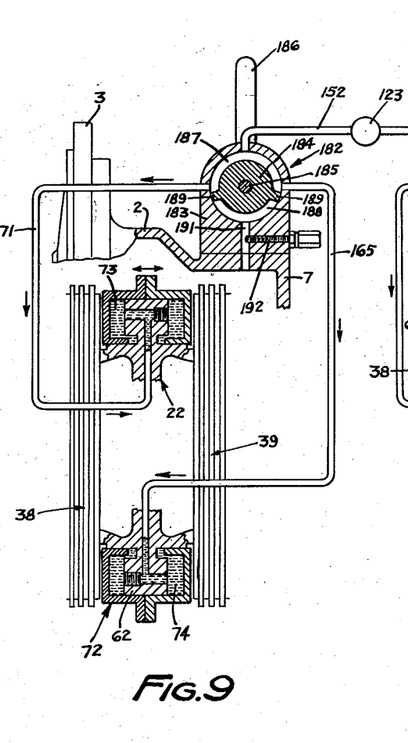
Figure 9 is a diagrammatic view showing a fluid control system of slightly different construction, wherein means is provided for timing the operation of shifting the gearing from full forward to full reverse, or vice versa, without imparting any shocks to the transmission and associated parts, the valve lever being shown in neutral position.

As here shown, a control valve, generally designated by the numeral 182, is substituted for the control valve 127, shown in the previous figures. Valve 182 comprises a housing 183 having means for mounting it in a convenient location as, for example, upon the housing 2 of the reverse gear mechanism, as indicated in Figure 9. The valve housing 183 is bored to receive a rotor 184. A rock shaft 185 is secured in the rotor and has an operating handle 186, whereby the valve may be conveniently manipulated to control the selective operation of the gearing.

The valve rotor 184 is shown provided with diametrically opposed peripheral recesses 187 and 188, separated from one another by radial wall elements 189 of the valve rotor. Fluid supply pipe 152 has its discharge end in constant communication with the peripheral recess 187 of the valve rotor. Conduits 171 and 165 of pressure chambers 73 and 74, respectively, are also in communication with recess 187, when the valve handle 186 is in its neutral position, shown in Figure 9. Control valve 182 has a single exhaust port or fluid return duct 191 having one end in constant communication with the peripheral recess 188 of the valve rotor 184, and its opposite end in communication with the interior of the main housing, whereby the return fluid from ducts 165 and 171 to the interior of the housing is through the single exhaust duct 191, as clearly indicated in Figure 9.

Figure 12:
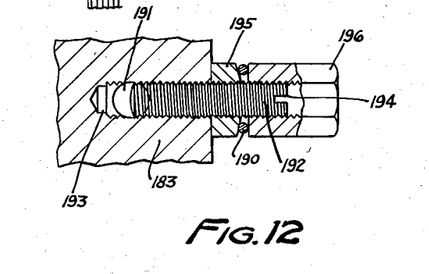
Figure 12 is an enlarged detail sectional view on the line 12—12 of Figure 9, showing the valve means for constructing the return flow of fluid to the oil sump.

The means provided for timing or controlling the movement of the clutch and brake actuating member or cylinder 72 from one position to another, depending upon the movement of the valve handle 186, resides in the provision of means in the exhaust passage 191 of the valve for restricting fluid flow therethrough, whereby a controlled back pressure is developed in the fluid returning through ducts 165 or 171 to the exhaust duct 191. To thus restrict fluid flow through the exhaust port or duct 191, an adjusting screw 192 is adjustably received in a blind hole 193 provided in the body of the valve housing. The hole 193 traverses the exhaust port 191, as best illustrated in Figure 12.

The blind hole 193 is threaded, as shown, whereby the screw 192, which preferably has a slotted head 194, may be axially adjusted in the threaded socket 193, thereby to partially traverse the exhaust port 191 and thus restrict fluid flow therethrough to the interior of the housing. By thus restricting fluid flow through exhaust port 191, the time required for the pressure fluid to return from the pressure chamber from which the fluid is being released, may be accurately varied and controlled between a minimum time interval of approximately one and one-half seconds, for fast shifting of the clutch and brake actuating lever, to a maximum time interval of approximately seven seconds, whereby the movement of the clutch and brake actuating member is very gradual, and thereby relieves the mechanism of shocks and excessive strains, when shifting the clutch and brake actuating member 72 from one position to another.

From actual experience, it has been found that by delivering the pressure fluid to the valve from the pump at a pressure of approximately one hundred twenty-five pounds per square inch, and adjusting the screw 192 to maintain a back pressure of approximately one hundred pounds per square inch in the exhaust port 191, shifting of the clutch and brake actuating member 72 from one position to another is retarded sufficiently to positively prevent shocks and excessive strains from being imposed in the apparatus. The time interval required by the clutch and brake actuating member for moving from one position to another may be controlled at will by manipulation of the adjusting screw 192.

Adjusting screw 192 has a lock nut 195 for locking it in adjusted position. It may also be provided with a protecting cap 196 adapted to be received in threaded engagement with the outer slotted end 194 of the screw to protect it against damage and to prevent unauthorized tampering therewith. A suitable sealing element or gasket 190 may also be inserted between the lock nut 195 and protecting cap 196 to prevent leakage.

In the operation of the control valve shown in Figure 9, when the valve handle 186 is in its normal neutral position, shown in Figure 9, the exhaust port 191 is completely closed to fluid flow because of the radial wall elements 189 of the valve rotor 184 cutting off communication between the exhaust port and the fluid supply pipe 152. Fluid, however, is pumped into the annular recess 187 of the valve rotor, and from there flows through ducts 165 and 171, into fluid pressure in chambers 73 and 74. The pressure of the fluid delivered to chambers 73 and 74, when the valve is thus in neutral position, will be equalized in the two chambers, whereby the clutch- and brake-actuating member 72 is retained in its neutral position, shown in Figures 1 and 9.

Figures 10, 11:
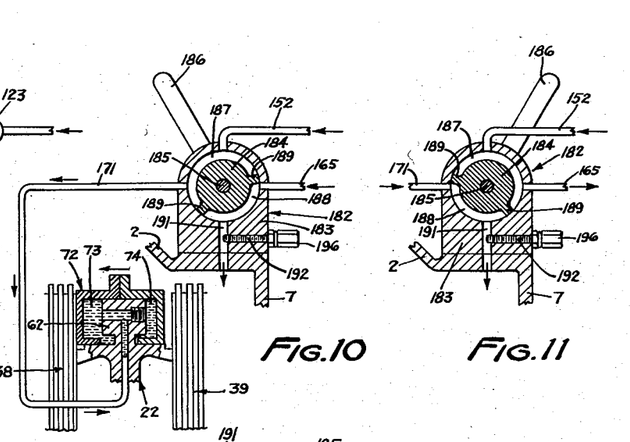
Figure 10 is a similar view with some of the parts omitted, and showing the control lever in its "forward" position.
Figure 11 is a view similar to Figure 10, but showing the valve handle in reverse position.

When the control lever 186 is shifted into its forward position, as shown in Figure 10, fluid flow is established through duct 171 to pressure chamber 73. Simultaneously, chamber 74 is opened to the interior of the main housing through duct 165, peripheral recess 188 of the rotor, and through the open exhaust port 191, thereby releasing the fluid pressure in chamber 74, whereby the increased pressure in chamber 74 axially shifts clutch- and brake-actuating member 72 into engagement with the forward clutch 38. During such operation, a constant pressure is maintained in chamber 73 by the pump 123, it being understood that excess fluid pressures developed by the pump in the fluid supply line 152 are released to the interior of the housing by the pressure relief valve 126, as hereinbefore described. It will thus be noted that the shifting of clutch and brake actuating member 72 from one position to another is effected entirely by the differential in the fluid pressures in pressure chambers 73 and 74.

Assuming now that the maximum or line pressure of the fluid delivered to chamber 73 by pump 123 is one hundred twenty-five pounds per square inch, and the fluid pressure adjusting screw 192 is positioned to maintain a back pressure of one hundred pounds per square inch in the exhaust port 191; under such conditions, the pressure differential of the fluid in chambers 73 and 74 is twenty-five pounds, which would be the net clutch operating pressure of the clutch- and brake-engaging member 72 against the discs of clutch 38 to initiate operation of said clutch. By utilizing such low fluid pressure to indicate operation of clutch 38, the drum 33 of the differential gearing may be started substantially without shock, and the clutch quickly comes up to its full holding power because the back pressure in chamber 74 is immediately dissipated.

The entire apparatus, as clearly illustrated in Figure 1, is very compact. The hydraulically operated clutch 38 and brake 39 are self-adjusting and provide smooth engagement at all times. The single control valve also makes it possible to quickly and without shock reverse the traveling movement of the craft, and provides maximum maneuverability, a highly desirable feature in many forms of water craft, such as patrol boats, and the like.

The novel construction and arrangement of the clutch and brake actuating member or cylinder 72 in conjunction with the annular piston member 62 on the drum 33, provides a clutch and brake actuating mechanism which is highly efficient and positive in action, and one in which the shifting of the clutch and brake actuating member 72 from neutral into engagement with one or the other of the clutch or brake, may be accurately and conveniently controlled by the simple manipulation of the single control lever 158.

The unique arrangement of the pump driving means also constitutes an important feature of the invention, in that by driving the pump directly from the engine crank shaft, fluid under pressure is immediately made available for shifting the clutch- and brake-actuating member 72 from neutral into engagement with a selected clutch or brake, upon initial starting of the engine. The relief valve interposed in the high pressure conduit 152 of the pump prevents excessive pressures from developing in the hydraulic system and, at the same time, assures adequate and full lubrication of all moving parts of the apparatus at all times.

The location of the oil filter 124 and cooler 125 between the pump 123 and control valve 127, is also important, in that all fluid is subjected to the actions of the filter and cooler prior to being delivered into the control valve for re-circulation through the fluid circulating system of the apparatus, including the pressure chambers 73 and 74, and all moving parts thereof. The oil pan 106 in the lower portion of the auxiliary chamber 8 also assures an adequate supply of clean oil to the gears 84 and 85 at all times.

In the drawings we have shown the invention embodied in a marine gear comprising a back gear, whereby the propeller may be rotated in either forward or reverse. It is to be understood, however, that the invention may be embodied in other forms of marine gears where applicable without departing from the scope of the invention.

The foregoing description has been given for clearness of understanding only, and no unnecessary limitations should be understood therefrom, and the appended claims should be construed as broadly as permissible in view of the prior art.

We claim as our invention:

1. In a forward and reverse power transmission mechanism including a driving bevel gear having means for connecting it to a source of power and a driven bevel gear having means for connecting it to a member to be driven, a drum having oppositely disposed cylindrical bearing portions separated from one another by a larger intermediate cylindrical portion, planet bevel gears rotatably secured to said drum and engaging said driving bevel gear and said driven bevel gear, a clutch at the drive end of said drum and a brake at the driven end thereof; the improvement comprising a combined clutch and brake operating mechanism for effecting forward or reverse rotation of said driven bevel gear, the larger intermediate portion of said drum serving as a piston which is rotatable as a unit with said drum, an annular tubular member fitted over said larger intermediate portion and axially slidable thereon, the opposed end portions of said annular tubular member co-operating with said intermediate piston-forming portion to provide two annular pressure fluid chambers, fluid under pressure in said chambers, means for normally retaining said annular tubular member in neutral position, and means for controlling the flow of fluid under pressure to and from said annular pressure chambers to axially shift the position of said annular tubular member on said drum, thereby to selectively actuate said clutch and brake to control the operation of the composite transmission mechanism.

2. A forward and reverse power transmission mechanism according to claim 1, wherein said clutch and brake each comprises a group of friction disks and the disks of each group being disposed in flatwise relation with respect to one another, said groups of disks being arranged to be alternately engaged by said annular tubular member, thereby to selectively effect the operations of the clutch and brake.

3. A forward and reverse power transmission mechanism according to claim 1, wherein said annular tubular member is composed of two like parts secured together to provide a composite tubular cylinder-forming member fitted over and completely concealing said larger intermediate drum portion and co-operating therewith to provide, in effect, two opposed axially movable cylinders.

4. A forward and reverse power transmission mechanism according to claim 3, wherein a main fluid tight housing having an oil sump therein completely encloses said gears, clutch, brake, and the operating mechanism for the clutch and brake.

5. A forward and reverse power transmission mechanism according to claim 4, wherein said main housing has a fluid circulating system therein which is in direct communication with said sump, and said system has a single control lever therein for controlling circulation of the pressure fluid through said system to effect operation of the composite transmission, said control lever being conveniently located exteriorly of the main housing.

References Cited in the file of this patent

UNITED STATES PATENTS

| | | |
|---|---|---|
| 847,834 | Sears et al. | Mar. 19, 1907 |
| 899,247 | Drake | Sept. 22, 1908 |
| 1,318,843 | Carmichael | Oct. 14, 1919 |
| 1,439,402 | Buckwalter | Dec. 19, 1922 |
| 1,459,894 | Irwin | June 26, 1923 |
| 1,653,262 | Dickson | Dec. 20, 1927 |
| 1,785,475 | Bliven | Dec. 16, 1930 |
| 2,018,014 | Fahrney | Oct. 22, 1935 |
| 2,050,344 | Lapham | Aug. 11, 1936 |
| 2,158,054 | Bradbury | May 16, 1939 |
| 2,213,111 | Strout | Aug. 27, 1940 |
| 2,480,938 | Lapsley | Sept. 6, 1949 |
| 2,547,038 | Parrish | Apr. 3, 1951 |
| 2,633,034 | Mathers | Mar. 31, 1953 |
| 2,667,248 | Wissman | Jan. 26, 1954 |
| 2,669,971 | Mooney | Feb. 23, 1954 |
| 2,674,220 | Ware | Apr. 6, 1954 |
| 2,771,974 | Mooney | Nov. 27, 1956 |

UNITED STATES PATENT OFFICE
CERTIFICATE OF CORRECTION

May 12, 1959

Patent No. 2,885,909

John D. Mooney et al.

It is hereby certified that error appears in the printed specification of the above numbered patent requiring correction and that the said Letters Patent should read as corrected below.

Column 2, line 42, before "clutch" strike out "forward", and insert the same before "direction", in line 43, same column; column 13, lines 55 and 56, for "indicate" read -- initiate --.

Signed and sealed this 6th day of October 1959.

(SEAL)
Attest:

KARL H. AXLINE
Attesting Officer

ROBERT C. WATSON
Commissioner of Patents